US009283809B2

(12) United States Patent
Hoogendoorn

(10) Patent No.: US 9,283,809 B2
(45) Date of Patent: Mar. 15, 2016

(54) OUTBOARD AXLE BEARING STRUCTURE FOR A BICYCLE OR MOTORCYCLE

(75) Inventor: Steven W. Hoogendoorn, Evergreen, CO (US)

(73) Assignee: Yeti Cycling, LLC, Golden, CO (US)

( * ) Notice: Subject to any disclaimer, the term of this patent is extended or adjusted under 35 U.S.C. 154(b) by 0 days.

(21) Appl. No.: 13/453,431

(22) Filed: Apr. 23, 2012

(65) Prior Publication Data

US 2012/0200146 A1 Aug. 9, 2012

Related U.S. Application Data

(63) Continuation of application No. 12/167,149, filed on Jul. 2, 2008, now Pat. No. 8,162,344.

(60) Provisional application No. 60/947,824, filed on Jul. 3, 2007, provisional application No. 60/947,898, filed on Jul. 3, 2007.

(51) Int. Cl.
| | | |
|---|---|---|
| *B60B 27/04* | (2006.01) | |
| *F16C 11/04* | (2006.01) | |
| *B60B 27/00* | (2006.01) | |
| *B60B 27/02* | (2006.01) | |

(Continued)

(52) U.S. Cl.
CPC ............ *B60B 27/04* (2013.01); *B60B 27/0052* (2013.01); *B60B 27/023* (2013.01); *B62K 25/02* (2013.01); *F16C 11/045* (2013.01); *B62K 25/28* (2013.01); *F16C 2326/05* (2013.01); *F16C 2326/26* (2013.01)

(58) Field of Classification Search
CPC ............ F16C 2326/05; F16C 2326/26; F16C 33/4676; F16C 33/4664; F16C 11/045; B62K 25/28

USPC ............ 280/288, 284; 301/109; 384/262, 431
See application file for complete search history.

(56) References Cited

U.S. PATENT DOCUMENTS

| | | | | |
|---|---|---|---|---|
| 472,005 | A | * 3/1892 | Vale .............................. | 280/274 |
| 2,018,973 | A | 10/1935 | Pomeroy | |
| 3,733,648 | A | * 5/1973 | Asberg et al. ..................... | 16/21 |

(Continued)

FOREIGN PATENT DOCUMENTS

| | | |
|---|---|---|
| EP | 0941917 | 9/1999 |
| EP | 1060979 | 12/2000 |

(Continued)

OTHER PUBLICATIONS

European Search Report, European Patent App. No. 08781315.0, Dated Apr. 11, 2011, 8 pages.

(Continued)

*Primary Examiner* — Joseph Rocca
*Assistant Examiner* — Daniel Yeagley
(74) *Attorney, Agent, or Firm* — Dorsey & Whitney LLP

(57) ABSTRACT

In one example, a structure for attaching a wheel to one of a frame of a motorcycle or a bicycle may include an axle having first and second opposing end portions and supporting a wheel, a left axle support collar structure configured to support the first opposing end portion of the axle, and a right axle support collar structure configured to support the second opposing end portion of the axle. A first bearing is positioned in the left axle support collar structure, and a second bearing is positioned in the left axle support collar structure. The axle rotates relative to the frame.

23 Claims, 5 Drawing Sheets

(51) Int. Cl.
*B62K 25/02* (2006.01)
*B62K 25/28* (2006.01)

(56) References Cited

U.S. PATENT DOCUMENTS

| | | | |
|---|---|---|---|
| 3,938,864 A * | 2/1976 | Haussels | 384/482 |
| 4,089,570 A * | 5/1978 | Markfelder et al. | 384/510 |
| 4,632,415 A | 12/1986 | Hai | |
| 5,121,937 A | 6/1992 | Lawwill | |
| 5,356,165 A | 10/1994 | Kulhawik et al. | |
| 5,372,371 A | 12/1994 | Larson | |
| 5,549,315 A | 8/1996 | Ashman | |
| 5,553,881 A | 9/1996 | Klassen et al. | |
| 5,628,524 A | 5/1997 | Klassen et al. | |
| 6,488,301 B2 | 12/2002 | Klassen et al. | |
| 6,712,374 B2 | 3/2004 | Assier | |
| 6,886,846 B2 | 5/2005 | Carroll | |
| 7,048,292 B2 | 5/2006 | Weagle | |
| 7,128,329 B2 | 10/2006 | Weagle | |
| 7,520,522 B2 * | 4/2009 | Julliard et al. | 280/281.1 |
| 7,703,785 B2 * | 4/2010 | Colegrove et al. | 280/260 |
| 7,837,213 B2 * | 11/2010 | Colegrove et al. | 280/284 |
| 7,918,474 B2 * | 4/2011 | Waxham | 280/288 |
| 8,006,993 B1 | 8/2011 | Chamberlain | |
| 8,459,680 B2 | 6/2013 | Chamberlain | |
| 2004/0036251 A1 | 2/2004 | Baldwin | |
| 2005/0052072 A1 | 3/2005 | Schlanger | |
| 2005/0067806 A1 | 3/2005 | Weagle | |
| 2005/0067810 A1 | 3/2005 | Weagle | |
| 2006/0119070 A1 | 6/2006 | Weagle | |
| 2006/0225942 A1 | 10/2006 | Weagle | |
| 2007/0024022 A1 | 2/2007 | Weagle | |
| 2007/0108724 A1 | 5/2007 | Julliard et al. | |
| 2008/0054595 A1 | 3/2008 | Lu | |
| 2008/0067772 A1 | 3/2008 | Weagle | |

FOREIGN PATENT DOCUMENTS

| | | |
|---|---|---|
| FR | 2782471 A1 * | 2/2000 |
| WO | 87/04129 A1 | 7/1987 |
| WO | 9944880 | 9/1999 |

OTHER PUBLICATIONS

PCT International Search Report and Written Opinion for corresponding PCT Application No. PCT/US2008/069117, dated Sep. 8, 2008, 7 pages.

* cited by examiner

OUTBOARD AXLE BEARING STRUCTURE FOR A BICYCLE OR MOTORCYCLE

CROSS-REFERENCES TO RELATED APPLICATIONS

This application is a continuation of application Ser. No. 12/167,149 (published as U.S. Publication No. 2009/0008987), entitled "Outboard Axle Bearing Structure for a Bicycle or Motorcycle," and filed on Jul. 2, 2008, which claims under 35 U.S.C. §119(e) the benefit of both U.S. patent application No. 60/947,824 and entitled "Outboard Axle Bearing System for a Bicycle or Motorcycle," filed Jul. 3, 2007, and U.S. patent application No. 60/947,898 and entitled "Single Sided Chain Stay Structure for a Bicycle," filed Jul. 3, 2007, both of which are assigned to the Assignee of this application. The contents of each of the foregoing applications are hereby incorporated by reference in their entireties as if fully set forth herein.

FIELD OF THE INVENTION

The invention is a hub system for attaching a wheel to a bicycle, and more particularly a hub system where the bearing is mounted on the frame and the axle rotates relative to the frame.

BACKGROUND OF THE INVENTION

Currently, wheel hubs for bicycles have internal axle bearings. These bearings allow the wheel to rotate with respect to the axle and frame. In these current designs the axle is fixed rigidly to the frame or fork and it does not rotate respectively thereto. Hub designs, especially rear hubs, have constraints on them due to componentry that are installed on the hub; such as gear cassettes and disc rotors for disc brake assemblies. These constraints are related to, but not limited to, bearing size, axle size and load capacity.

There is needed in the art an axle and hub design wherein these design constraints are addressed.

SUMMARY OF INVENTION

The invention described herein pertains to the mounting of a wheel on a motorcycle, bicycle or other such vehicle, where the bearings for supporting the axle of the wheel are mounted to the frame as opposed to the wheel structure itself. Thus, in one aspect this invention may allow the axle to rotate relative to the frame.

One example of the invention may take the form of a structure for attaching a wheel to a frame of a bicycle. The structure may include an axle having first and second opposing end portions and supporting a wheel, a left axle support collar structure configured to support the first opposing end portion of the axle, and a right axle support collar structure configured to support the second opposing end portion of the axle. A first bearing may be positioned in the left axle support collar structure, and a second bearing may be positioned in the left axle support collar structure. The first and second bearings may allow the axle to rotate relative to the frame.

Further to this example, the left axle support collar structure may include a chain stay axle support collar and a seat stay axle support collar. In another example, the first bearing may be positioned in the chain stay axle support collar and the second bearing may be positioned in the seat stay axle support collar. In a further example, the first bearing may include at least one inner race configured to engage the axle and a first outer race associated with the left seat stay support collar and configured to rotate relative to the at least one inner race. In another example, the second bearing may include a second outer race associated with the left seat chain stay support collar and separate from the first outer race, and the second outer race may be configured to rotate relative to the at least one inner race. In a further example, the at least one inner race includes a common inner race and the first outer race and the second outer race may both be configured to rotate relative to the common inner race.

In another example, the left axle support collar structure may include a first chain stay axle support collar and a first seat stay axle support collar. The right axle support collar structure may include a second chain stay axle support collar and a second seat stay axle support collar, and a bearing may be positioned in each of the first and second seat stay axle support collars and the first and second chain stay axle support collars. In a further example, the wheel may include a hub, the hub may be received on the axle, and the axle and the hub may rotate together. In another example, the hub may be removable from the axle. In a further example, the hub may have opposing ends, with each of the opposing ends forming a threaded recess. The hub may be positioned between the left axle support collar structure and the right axle support collar structure. In this example, a first retaining fastener may be received through the first and second bearings in the left axle support collar structure and received in one threaded recess in the hub, and a second retaining fastener may be received through the right axle support collar structure and received in the other threaded recess in the hub. In other examples, a third bearing may be positioned in the right axle support collar structure, and a fourth bearing may be positioned in the right axle support collar structure.

Another example of the invention may take the form of a bicycle for riding on a support surface. The bicycle may include a frame, at least one wheel for engaging a support surface and including an axle with opposing first and second end portions, and a first axle support structure configured to support the first end portion of the axle. The first axle support structure may include a first axle support collar, a second axle support collar, a first bearing positioned in the first axle support collar, and a second bearing positioned in the second axle support collar.

In another example, the bicycle may include a second axle support structure configured to support the second end portion of the axle. The second axle support structure may include a third axle support collar and a third bearing positioned in the third axle support collar. The axle may rotate in the first, second, and third bearings relative to the frame. In another example, the second axle support structure may further include a fourth axle support collar and a fourth bearing positioned in the fourth axle support collar. The axle may rotate in the first, second, third, and fourth bearings relative to the frame.

Another example of the invention may take the form of a structure for attaching a wheel to a frame of a bicycle. The structure may include an axle having opposing end portions and supporting a wheel, and a left axle support collar structure configured to support one of the opposing end portions of the axle. The left axle support collar structure may include a separate chain stay axle support collar and a separate seat stay axle support collar, and a first bearing structure positioned in the left axle support collar structure. The first bearing structure may include at least one first ball bearing positioned between the chain stay axle support collar and the axle. The at least one first ball bearing may allow for rotation of the axle relative to the chain stay axle support collar. The first bearing structure may further include least one second ball bearing positioned between the seat stay axle support collar and the axle. The at least one second ball bearing may allow for rotation of the axle relative to the seat stay axle support collar.

In some examples, the axle may include an axle body and at least one axle extension. The first ball bearing may be positioned between the chain stay axle support collar and the at least one axle extension, and the second ball bearing may be positioned between the seat stay axle support collar and the at least one axle extension.

Further non-limiting benefits and features of the invention described herein are observed by the disclosure of the detailed specification, drawings, and claims provided herein.

FIGURE DESCRIPTION

DETAILED DESCRIPTION

The invention described herein relates to the placement of the bearing(s) relative to a wheel hub for use on a bicycle or motorcycle, or other such vehicles where a wheel is rotatably connected to a fork-like structure. As described herein, reference is made to a bicycle structure for clarity purposes, but does not limit the applicability to other types of vehicles and related structures this invention may apply to.

As an introduction, in a typical hub design for connecting a wheel to a fork structure, the bearings are internal to the hub structure. In these typical designs, the axle is fixed to the frame, such as at a fork structure (which is hereby defined to include front forks and rear triangle wheel mounting and connection structures), and does not rotate relative thereto. The hub, often including the gear cassette, disc brake rotor, and spoke anchors, is received on the fixed axle, and rotates relative to the fixed axle by way of at least one bearing positioned between the hub and the fixed axle.

The instant invention encompasses a structure and associated method that allows the axle to rotate relative to the fork structure (and thus the frame) by repositioning the bearings from inside the hub and engaging the axle to being set in the forks and rotatably receiving the axle. The hub may then be integral with the axle, or may be a separate structure from the axle, but in any event may rotate in conjunction with the axle. The invention(s) encompassed herein are further described below with reference to the figures and set forth in the claims.

Figure 1:
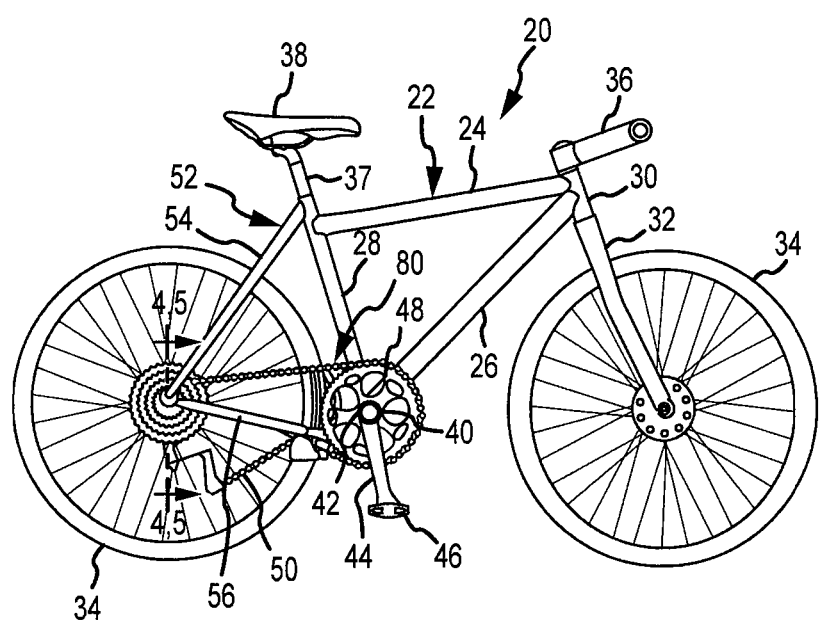
FIG. 1 shows a bicycle incorporating at least one aspect of the current invention.

FIG. 1 shows a bicycle 20 encompassing the present invention. The bicycle includes a common frame structure 22 having a top tube 24 and down tube 26 and seat tube 28. The top tube and down tube are connected at a front end to a head tube 30. The head tube supports a front fork 32, wheel 34 and handlebar 36 in movable engagement with the frame 22. The rear end of the top tube engages the top end of the seat tube 28. A seat post 37, supporting a seat 38, is adjustably inserted into the top end of the seat tube. The rear end of the down tube engages the bottom end of the seat tube at or near a bottom bracket 40. The bottom bracket rotatably supports the crank set 42. The crank set includes cranks 44 and pedals 46, and a gear ring 48 for engaging the drive chain 50. The rear triangle 52 of the bicycle frame 22 is shown in FIG. 1 as including a pair of seat stays 54 (only one shown in FIG. 1) and a pair of chain stays 56 (only one shown in FIG. 1). The seat stays 54 are attached to the top end of the seat tube 28. The chain stays 56 are attached to the bottom end of the seat tube 28 at or near the bottom bracket 40.

Figure 2:
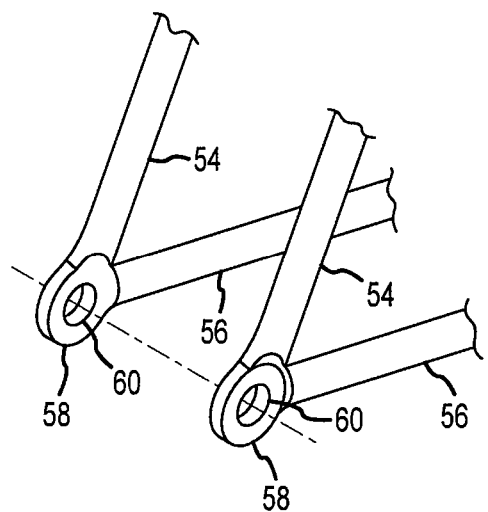
FIG. 2 shows a portion of a rear triangle where the seat stay and chain stay structures are of unitary construction.
Figure 3:
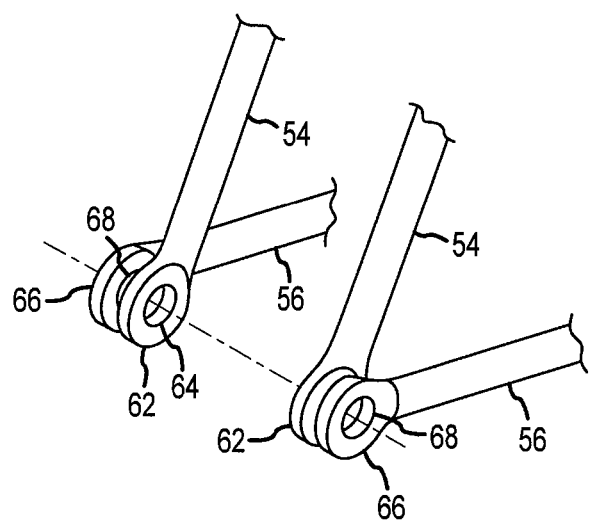
FIG. 3 shows a portion of a rear triangle where the seat stay and chain stay structures are not of unitary construction.

The rear ends of the seat stays 54 and chain stays 56 may be adapted to be a unitary structure, such as that shown in FIG. 2, or may be a non-unitary structure such as that shown in FIG. 3. These two alternatives are described in more detail below. Whether unitary or not, the rear ends of the seat stays and chain stays may support a wheel, hub, gear cassette (for engaging the drive chain), disc brake mechanism, and derailleur.

There are many different types of frame structures available for a bicycle that are able to adapt the invention herein. For instance, while a "hard tail" bicycle suspension is shown in FIG. 1, a frame having a rear suspension or a full suspension may also be applicable. Each of these different frame suspensions support an axle, wheel and hub with a chain stay and seat stay structure, where this invention would be implemented.

Further, the mechanism for attaching the seat stays and chain stays to the frame is not limiting to the implementation of this invention. The invention may also be implemented on the front fork of a bicycle, and may be implemented on rear triangle structures having one or two seat stays and only one chain stay. This invention may also be utilized on a motorcycle where only a one-sided swing arm is used.

FIG. 2 shows the rear ends of the seat stays 54 and chain stays 56 as a unitary structure. The traditional "drop-out" structure, which receives the axle and the hub and typically has a downwardly facing slot to allow the axle and hub to be removed, is in this example replaced by a axle support collar 58. Each of the rear ends of the unitary structure includes an axle support collar. The axle support collar 58 forms an aperture 60 for receiving a bearing for rotatably supporting the axle and hub structure, as is described in more detail below. The axle support collar 58 shown here completely surrounds the aperture 60, however, it is contemplated that the axle support collar 58 may only partially encompass the aperture 60 and still adequately receive the bearing to rotatably support the axle and hub structure. Further, the axle support collar 58 may be positioned other than at the intersection of the chain stay 56 and seat stay 54 on each side.

FIG. 3 shows a rear triangle where the chain stay 56 and seat stays 54 are not a unitary structure, such as that shown in FIG. 2. Each rear end of the chain stay 56 (on each side) is not connected with the corresponding rear end of the seat stay 54. This type of structure is utilized on some frames that have a rear suspension. In this example, each seat stay 54 end includes an axle support collar 62 having an aperture 64 formed therein, and each chain stay end includes an axle support collar 66 having an aperture 68 formed therein. As noted above, the collars 62, 66 may or may not fully surround the aperture 64, 68. The axle support collars 62, 66 receive a bearing (shown below) for rotatable support of an axle and hub received therein. Each collar 62, 66 may receive a bearing, or each adjacent pair of axle support collars (i.e. each pair of the seat stay and chain stay on either side) may receive a single bearing having a common inner race and a separate outer race for each stay. This is described in more detail below.

Figure 4:
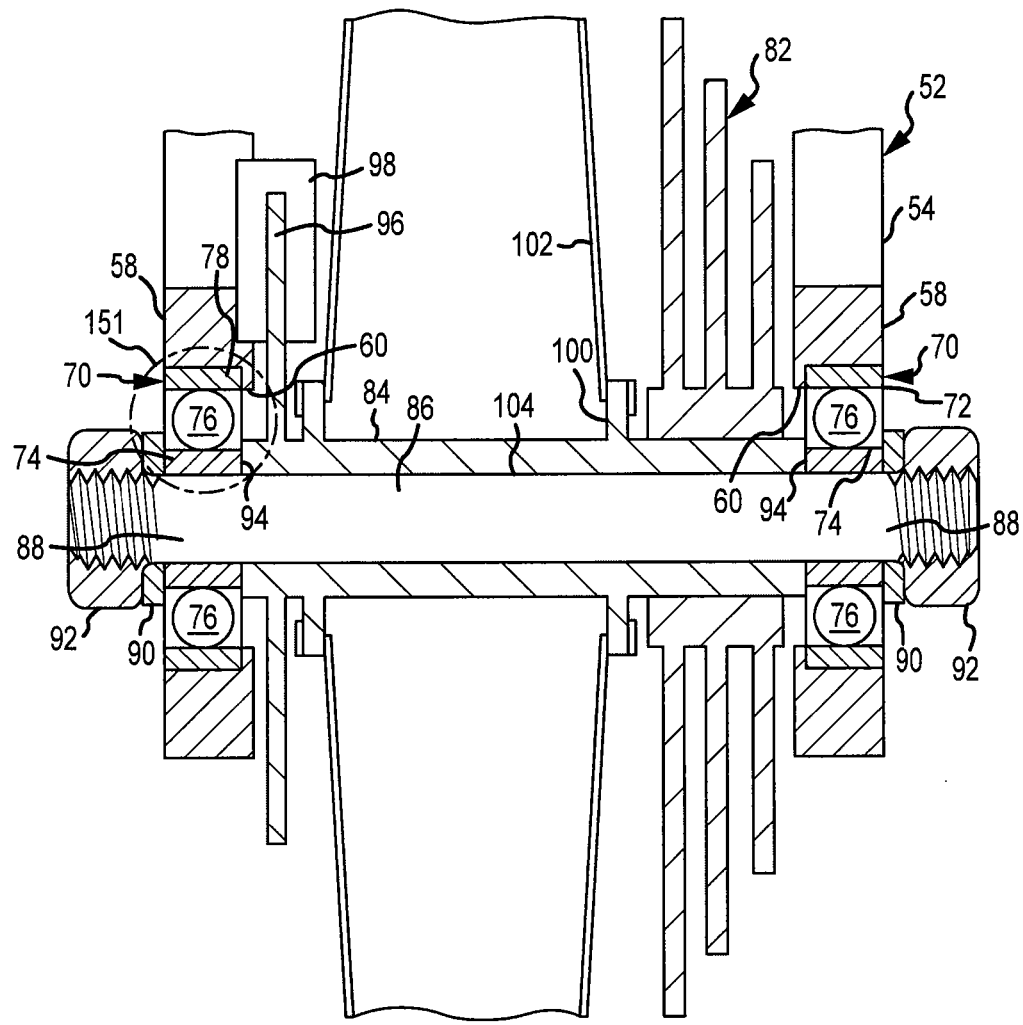
FIG. 4 is a section taken along line 4-4 of FIG. 1 where the chain stay and seat stay are of unitary construction as shown in FIG. 2.

FIG. 4 shows an example of the instant invention implemented in a bicycle frame, such as shown in FIG. 1, having a unitary rear triangle structure. The left and right (as portrayed herein) unitary seat and chain stays each have an axle support collar 58, each axle support collar defining an aperture 60. A bearing 70 is firmly seated in each aperture 60, and each bearing includes an outer race 72 and an inner race 74, with a plurality of ball bearings 76 positioned between, as is known. In its seated position, the outer race 72 of each bearing 70 engages a shoulder 78 formed on the axle support collar 58. The shoulder 78 engages the inside edge of the outer race 72 to help firmly position the bearing 70 in place. Each bearing 70, in this example, is a one-way bearing. This allows the chain drive 80 (see FIG. 1) to engage the gear cassette 82 and propel the bicycle when the user pedals in the forward direction, and for the hub 84 and axle 86 to free-wheel (rotate freely) then the user holds the pedals still or pedals relatively backwards.

An axle 86 is received through the inner race 74 on each side and extends between the bearings 70. Each end 88 of the axle extends beyond the bearing 70 on each side. Each axle end 88 has external threading for receiving a fastener, such as a washer 90 and nut 92, to fasten the axle 86 between the axle support collars 58. In this example, the washer 90 used on each end 88 of the axle 86 engages the outside edge of the bearing's inner race 74 to apply a compressive load thereto. The fastener on at least one end may be removable to allow the axle to be pulled out of the bearings. Any suitable fastener is contemplated, such as a snap ring, friction engagement, or a quick-connect. Where the axle collar 58 does not fully surround the aperture 60, and forms a slot, it may be sufficient for the fasteners to simply loosen and allow the axle to be removed through the slot. In this type of structure, the bearing 70 may need to be removed from the axle support collar 58 also.

Remaining with FIG. 4, the axle 86 is received in a hub 84, which is positioned between each of the axle support collars 58. The hub 84 snugly fits on the axle 86. Each end 94 of the hub 84 engages the inside edge of each inner race 74 to provide a surface against which the fasteners hold the bearings 70. Either end of the hub may engage an intermediate structure or structures, such as a spacer(s), which in turn engages an inside edge of the inner race 74. The hub 84 may include a brake disc rotor 96 for engagement with the caliper 98 (mounted on the seat stay or chain stay), a gear cassette 82 forming part of the drive train 80, and anchors 100 for the spokes 102. Of course the spokes 102 extend outwardly from the hub 84 to support a rim and tire, as is known. All together the hub 84 and its components form the wheel 34.

In the structure shown in FIG. 4, the axle 86 rotates relative to the frame 22 as the wheel 34 turns. The hub 84 rotates along with the axle 86. The hub 84 may be allowed to rotate relative to the axle 86 if a suitable bearing structure is positioned between the axle 86 and the hub 84, such as inside the internal hub channel 104 at either end. Also, the gear cassette 82 may be integral with the hub 84, or may be press-fit on the hub.

The gear cassette 82 may be mounted on the hub 84 with one or more one-way bearings. This would allow regular two-way bearings to be used in the axle support collars 58. Where one or more than one one-way bearing is positioned between hub 84 and the gear cassette 82, the drive chain 50 would drive the gear cassette 82 and the wheel 34 in the forward direction, and would allow free-wheeling when the user held the pedals in one position or pedaled relatively backwards.

To remove the wheel 34 from the frame 22 for replacement, maintenance, or transport, the fastener 92 may be removed from one end 88 of the axle 86. The axle 86 may then be pulled axially out of the hub 84 and the axle support collars 58. The hub 84 and wheel 34 may then "drop out" from between the axle support collars 58. The brake structure and the derailleur and chain may also need to be removed. Installation of the wheel is accomplished by positioning the hub 84 between the axle support collars 58 and in aligning the passageway 104 within the apertures 60. The axle 86 is then inserted from one end of the passageway 104 to the other, and the end fasteners 92 applied and tightened.

The structure described herein moves the bearings 70 laterally outwardly from inside the hub 84 to outside the hub 84. The advantages may include: allowing a larger diameter axle for a stronger structure and a stiffer assembly, a lighter assembly depending on the dimension and materials used, easier access and maintenance of the axle bearings, more design flexibility for wheel manufacturers, and more size options for the axle bearings.

Figure 5:
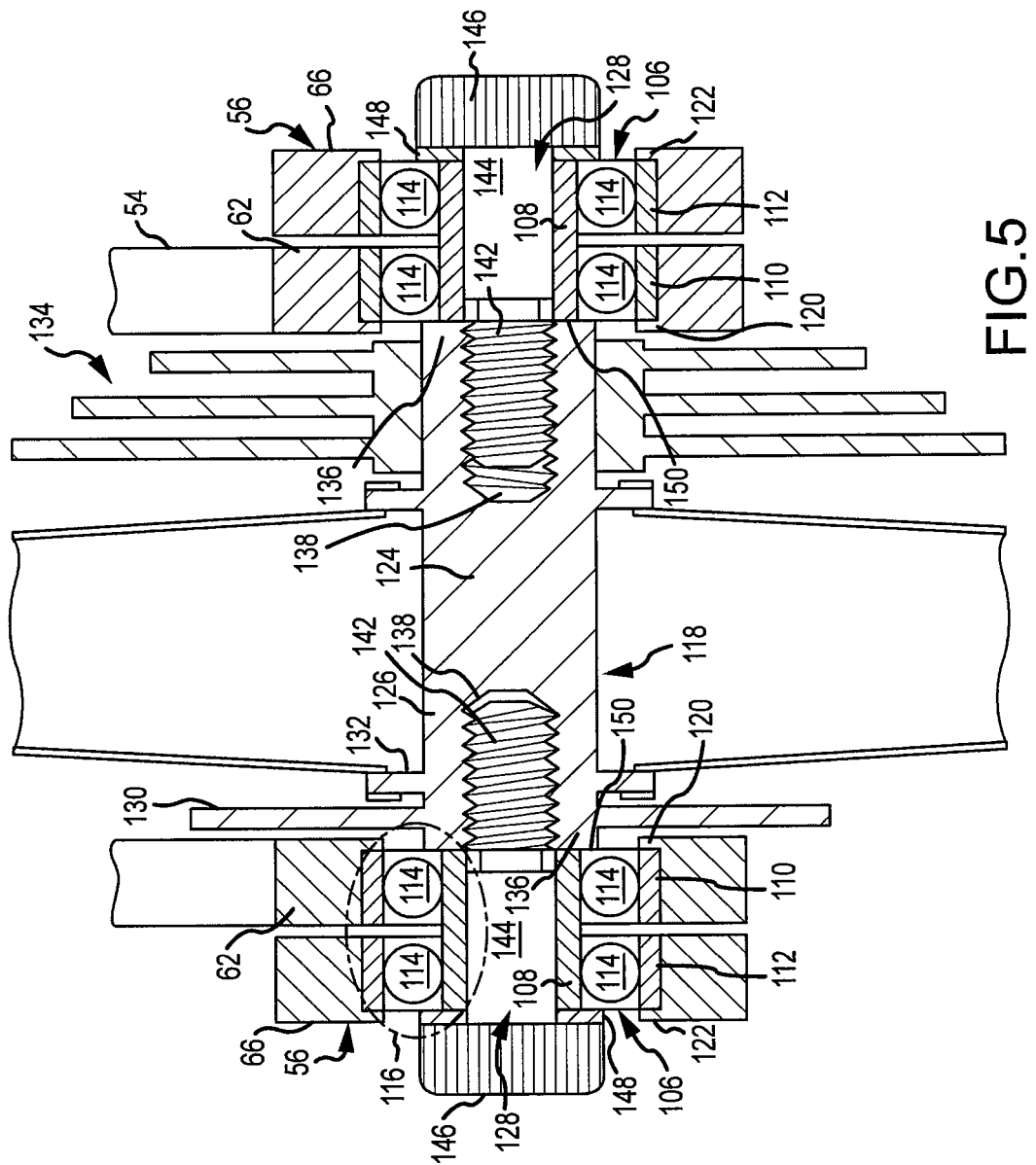
FIG. 5 is a section taken along line 5-5 of FIG. 1 where the chain stay and seat stay are of non-unitary construction.

FIG. 5 shows an example of the instant invention implemented in a bicycle frame, such as shown in FIG. 1, having a non-unitary rear triangle structure, such as that shown in FIG. 3. The left and right (as portrayed herein) non-unitary seat 54 and chain 56 stays each have an axle support collar (62, 66, respectively), each axle support collar defining an aperture (64, 68, respectively). A bearing having a common inner race 108 and separate outer races 110, 112 (and associated ball bearing members 114) is firmly seated in the commonly aligned apertures 64, 68 of the left and right paired chain 66 and seat 62 stay axle support structures. Focusing on the structure encircled by a dashed line 116 in FIG. 5 for explanation, it can be seen that the common inner race 108 is received over the axle structure 118 (described in more detail below). The inwardly of the two outer races 110 is firmly seated in the aperture 64 formed in the axle support structure 62 of the seat stay 54, and engages an inner shoulder 120 to help properly position the inwardly of the two outer races 110. The outwardly of the two outer races 112 is firmly seated in the aperture 68 formed in the axle support collar 66 of the chain stay 56, and engages an outer shoulder 122 to help property position the outer races 112. A spacer (not shown) may be positioned between the outer races 110, 112 to keep them, and their respective ball bearings 114, separated, or the structure of the outer races 110, 112 may be such that they are maintained in a spaced apart orientation even under lateral compressive forces.

Remaining with FIG. 5, the axle structure 118 in this example includes a combined axle 124, hub 126, and axle extensions 128. The combined axle 124 and hub 126 (collectively 118), similar to that as described above with respect to FIG. 4, may include a disc brake rotor 130, spoke anchors 132, and a gear cassette 134. Here, the axle 124 is integrally formed with the hub 126. Each end 136 of the hub 126 includes threaded recesses 138 for receipt of an axle extension 128. Each axle extension 128 may be both a retaining fastener and bearing surface. Each such axle extension 128 includes a threaded inner end 142 for thread engagement with the threaded recess 138. The outer portion 144 of the axle extension 128 has an outer circumferential profile sufficient to be a bearing surface received in the inner race 108 of the respective bearing 106. And the outer end 146 of each axle extension 128 has an engagement portion 146 (such as a knurled grip as shown, or nut, or alien head) for use in aiding the axle extension 128 to be threaded into the hub 126.

When assembled together, the axle extension 128 is inserted through the inner race 108 of the bearing 106 positioned in the axle support collars 62, 66 on one side. The threaded inner end 142 of the axle extension 128 is then inserted into the threaded recess 138 of the hub 126, which is positioned between the left and right ends of the rear triangle to allow alignment of the threaded recess 138 with the apertures 64, 68 formed in the left and right axle support collars 62, 66. The axle extension 128 is then threadedly received in the threaded recess 138 to cause the outer engagement portion 146 to engage (as shown here, the engagement is through a washer 148) the outside edge of the inner race 108 and create a laterally compressive force. A shoulder 150 formed at the end of the integral hub and axle 118, extending radially from the opening of the threaded recess 138, engages (itself or through another structure, such as a washer) the inside edge of the inner race 108 to help firmly seat the bearing 106, and to provide a surface against which the retaining fastener 146 creates the laterally compressive force. This same structure is found on both sides of the hub 126.

The wheel 34 is removed from the rear triangle for maintenance, replacement or transport by removing both retaining fasteners 146, in this example by unthreading them from the threaded recesses 138 and pulling the axle extensions 128 substantially out from the common inner race 108 on each side, and then removing the hub 126 from between the left and right paired axle support collars 62, 66.

This example of an implementation of the invention also may have the benefits described above with respect to the embodiment shown in FIG. 4. Additionally, this structure allows the separate seat and chain stay structures on either side of the hub to rotate independently from one another.

Each bearing 106, in this example, is a one-way bearing. Similar to that described above relating to FIG. 4, this allows the chain drive to engage the gear cassette 134 and propel the bicycle when the user pedals in the forward direction, and for the integral hub and axle 118 to free-wheel (rotate freely) then the user holds the pedals still or pedals relatively backwards.

It is contemplated that the integral axle and hub 118 may have a recess formed through the center from end to end, with the outer ends of the recesses having the threaded structures to receive the axle extensions 128.

Where the axle collars do not fully surround the aperture, and form a slot, it may be sufficient for the retaining fasteners to be simply loosened and allow the axle to be removed through the slot. In this type of structure, the bearing 106 may need to be removed from the axle support collars also. Further, in this embodiment as with that described in FIG. 4, the gear cassette 134 may be operably engaged with the hub 118 by one or more one-way bearing, thus allowing the other bearings to be two-way bearings.

The axle 86, mount 92, and hub 84 structure shown in FIG. 4 may be used in the example shown in FIG. 5 for a non-unitary rear triangle structure with separate chain stays and seat stays on either side. Likewise, the combination axle and hub 118 and axle extensions 128 shown in FIG. 5 may be used in the example shown in FIG. 4.

Figure 6:
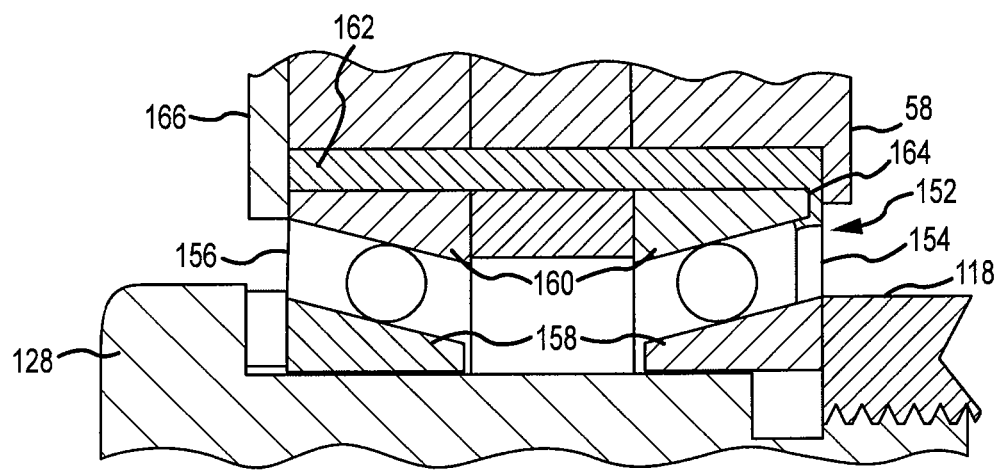
FIG. 6 is a representative cross section of a tapered bearing usable for a structure such as that shown in FIG. 4.

FIG. 6. shows an alternative angular contact bearing that may replace the bearing structures used in either FIG. 4 or FIG. 5. This angular contact bearing would work to replace the individual bearings used in FIG. 4, or it would work in FIG. 5 where each separate seat stay and chain stay has its own bearing. FIG. 6 represents the top of a single bearing, such as that shown in FIG. 4 and circled by dashed line 151. The attachment structure for the hub and axle in FIG. 6 is similar to that shown in FIG. 4. The combination axle and hub 118 and axle extensions 128 are used in this embodiment to attach to the axle support collar 58 of the unitary rear triangle of the example shown in FIG. 2. The angular contact bearing 152 is positioned in the aperture 60 to rotatably support the combination axle and hub 118 and axle extensions 128.

In this example of the bearing structure 152, the laterally inner-most bearing 154 and outer-most bearing 156 of the bearing structure 152 are separate, and have oppositely sloped radially inner races 158 and outer races 160, which when used together may provide higher performance in a axial thrust environment. The outer races 160 are contained in a housing 162 with an inner shoulder 164 to engage the inside edge of the inner-most bearing 154 outer 160 race. A retainer 166 on the axle support collar 58 engages the outside surface of the outer-most bearing 156 outer 160 race. The inner-most bearing 154 inner 158 race is contained on its inside surface by the hub 118, and the outer-most bearing 156 inner race 158 is contained by the end of the axle extension/retaining fastener 128. This bearing structure 152 may be a one-way bearing, or a two way bearing in the alternative, as described with respect to FIG. 5. Also, the bearings may have seal caps applied to help keep dirt, water, and other penetrables out of the ball bearing structures.

The bearings shown herein are schematic in nature for the purpose of explanation, and may have housing features that act as seals or covers. A suitable angular contact bearing for these purposes may include product number 432043 by the National Bearing Co. Further, it is contemplated that the bearings may be other than ball bearings, such as roller bearings, and may be replaced with bushings or the like in some circumstances.

The positioning of the axle bearing structures, as described herein, outside of the hub allow a wider engagement position for stronger and more stiff structure. It also may allow for larger diameter axles and hubs for stronger structures; and may also allow for lighter structures where the larger diameters allow for thinner material thicknesses.

Although preferred embodiments of this invention have been described above with a certain degree of particularity, those skilled in the art could make numerous alterations to the disclosed embodiments without departing from the spirit or scope of this invention as described in the specification, drawings and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, such joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A structure for attaching a wheel to a frame of a bicycle comprising:
  an axle having opposing end portions and supporting the wheel;
  a left axle support collar structure configured to support one of the opposing end portions of the axle, the left axle support collar structure including separate chain and seat stay axle support collars, the chain stay axle support collar formed in line with a chain stay and the seat stay axle support collar formed in line with a seat stay; and a first bearing structure positioned in the left axle support collar structure, the first bearing structure including:
at least one first ball bearing having a first bearing outer race and a first bearing inner race, wherein the at least one first bearing is positioned between the chain stay axle support collar and the axle, the at least one first ball bearing allowing for rotation of the axle relative to the chain stay axle support collar; and
at least one second ball bearing having a second bearing outer race and a second bearing inner race, wherein the second bearing is positioned between the seat stay axle support collar and the axle, the at least one second ball bearing allowing for rotation of the axle relative to the seat stay axle support collar, wherein the first bearing inner race and the second bearing inner race maintain their positions relative to one another and the first bearing outer race and the second bearing outer race move relative to one another.

2. The structure of claim 1, wherein the axle comprises an axle body and at least one axle extension, the first ball bearing is positioned between the chain stay axle support collar and the at least one axle extension, and the second ball bearing is positioned between the seat stay axle support collar and the at least one axle extension.

3. The structure of claim 1, further comprising:
a right axle support collar structure configured to support one of the opposing end portions of the axle, the right axle support collar structure including a separate chain stay axle support collar and a separate seat stay axle support collar; and
a second bearing structure positioned in the right axle support collar structure, the second bearing structure including:
at least one third ball bearing positioned between the chain stay axle support collar of the right axle support collar structure and the axle, the at least one third ball bearing allowing for rotation of the axle relative to the chain stay axle support collar of the right axle support collar structure; and
at least one fourth ball bearing positioned between the seat stay axle support collar of the right axle support collar structure and the axle, the at least one fourth ball bearing allowing for rotation of the axle relative to the seat stay axle support collar of the right axle support collar structure.

4. A structure for attaching a wheel to a frame of a bicycle comprising:
an axle having first and second opposing end portions and supporting the wheel;
a left axle support collar structure configured to support the first opposing end portion of the axle; and
a right axle support collar structure configured to support the second opposing end portion of the axle;
wherein the left axle support collar structure comprises a first chain stay axle support collar and a first seat stay axle support collar,
wherein the right axle support collar structure comprises a second chain stay axle support collar and a second seat stay axle support collar,
wherein bearings are positioned in each of the first and second seat stay axle support collars and the first and second chain stay axle support collars with each of the bearings having an outer race and an inner race, wherein adjacent bearings of the left axle support collar structure and adjacent bearings of the right axle support collar structure have their respective inner races maintain their positions relative to one another and have their respective outer races move relative to one another,
wherein the bearings are at least partially rotatable relative to the first and second seat stay axle support collars and the first and second chain stay axle support collars, and
wherein the bearings allow the axle to rotate relative to the frame.

5. The structure of claim 4, wherein the bearings positioned in each of the first and second seat stay axle support collars and the first and second chain stay axle support collars include the inner races being configured to engage the axle; and the outer races being associated with their respective seat stay axle support collars and their respective chain stay axle support collars are configured to rotate relative to their respective inner races.

6. A structure for attaching a wheel to a frame of a bicycle comprising:
an axle having first and second opposing end portions and supporting the wheel;
a left axle support collar structure configured to support the first opposing end portion of the axle;
a right axle support collar structure configured to support the second opposing end portion of the axle;
a first bearing having a first bearing outer race and a first bearing inner race, wherein the first bearing is positioned in the left axle support collar structure and at least partially rotatable relative to the left axle support collar structure; and
a second bearing having a second bearing outer race and a second bearing inner race, wherein the second bearing is positioned in the left axle support collar structure and at least partially rotatable relative to the left axle support collar structure;
wherein the first bearing inner race and the second bearing inner race maintain their positions relative to one another and the first bearing outer race and the second bearing outer race move relative to one another and the first and second bearings allow the axle to rotate relative to the frame;
wherein the wheel comprises:
a hub having opposing ends, each of the opposing ends of the hub forming a threaded recess and the hub positioned between the left axle support collar structure and the right axle support collar structure,
a first retaining fastener received through the first and second bearings in the left axle support collar structure and received in one threaded recess in the hub; and
a second retaining fastener received through the right axle support collar structure and received in the other threaded recess in the hub.

7. The structure of claim 6, wherein the left axle support collar structure comprises a first chain stay axle support collar and a first seat stay axle support collar.

8. The structure of claim 7, wherein the first bearing is positioned in the first chain stay axle support collar and the second bearing is positioned in the first seat stay axle support collar.

9. The structure of claim 7, wherein the right axle support collar structure comprises a second chain stay axle support collar and a second seat stay axle support collar.

10. A structure for attaching a wheel to a frame of a bicycle comprising:
an axle having first and second opposing end portions and supporting the wheel;
a left axle support collar structure configured to support the first opposing end portion of the axle;

a right axle support collar structure configured to support the second opposing end portion of the axle;

a first bearing having a first bearing outer race and a first bearing inner race, wherein the first bearing is positioned in the left axle support collar structure;

a second bearing having a second bearing outer race and a second bearing inner race, wherein the second bearing is positioned in the left axle support collar structure;

a third bearing positioned in the right axle support collar structure; and a fourth bearing positioned in the right axle support collar structure;

wherein the first and second bearings allow the axle to rotate relative to the frame; at least a portion of the first and second bearings is rotatable relative to the left axle support collar structure; at least a portion of the third and fourth bearings is rotatable relative to the right axle support collar structure; the first bearing inner race and the second bearing inner race maintain their positions relative to one another and the first bearing outer race and the second bearing outer race move relative to one another.

11. The structure of claim 10, wherein the left axle support collar structure comprises a chain stay axle support collar and a seat stay axle support collar.

12. The structure of claim 11, wherein the first bearing is positioned in the chain stay axle support collar and the second bearing is positioned in the seat stay axle support collar.

13. The structure of claim 10, wherein the first bearing inner race is configured to engage the axle; and the first bearing outer race is associated with a left seat stay support collar and configured to rotate relative to the first bearing inner race.

14. The structure of claim 13, wherein the second bearing outer race is associated with a left chain stay support collar and separate from the first outer race, the second outer race configured to rotate relative to the second bearing inner race.

15. The structure of claim 10, wherein the left axle support collar structure comprises a first chain stay axle support collar and a first seat stay axle support collar, the right axle support collar structure comprises a second chain stay axle support collar and a second seat stay axle support collar, and the first bearing and the third bearing are positioned in the first and second seat stay axle support collars, the second bearing and the fourth bearing are positioned in the first and second chain stay axle support collars.

16. The structure of claim 10, wherein the axle comprises a combined axle and hub structure.

17. The structure of claim 16, wherein the axle further comprises one or more retaining fasteners attachable to the combined axle and hub structure.

18. The structure of claim 10, wherein the wheel comprises:

a hub having opposing ends, each of the opposing ends of the hub forming a threaded recess and the hub positioned between the left axle support collar structure and the right axle support collar structure, a first retaining fastener received through the first and second bearings in the left axle support collar structure and received in one threaded recess in the hub; and a second retaining fastener received through the right axle support collar structure and received in the other threaded recess in the hub.

19. The structure of claim 10, wherein the first bearing inner race and the second bearing inner race are a unitary surface.

20. The structure of claim 10, wherein the first bearing inner race and the second bearing inner race are separate inner races having a common substrate.

21. The structure of claim 20, wherein the common substrate is an axle or an axle extension.

22. The structure of claim 1, wherein the left axle support collar structure comprises a chain stay axle support collar and a seat stay axle support collar that is a unitary construction.

23. A bicycle for riding on a support surface, the bicycle comprising:

a frame;

at least one wheel for engaging a support surface and including an axle with opposing first and second end portions;

a first axle support structure configured to support the first end portion of the axle and comprising:

a first axle support collar;

a second axle support collar;

a first bearing having a first bearing outer race and a first bearing inner race, wherein the first bearing is positioned in the first axle support collar and at least partially rotatable relative to the first axle support collar; and a second bearing having a second bearing outer race and a second bearing inner race, wherein the second bearing is positioned in the second axle support collar and at least partially rotatable relative to the second axle support collar; and a second axle support structure configured to support the second end portion of the axle and comprising:

a third axle support collar;

a fourth axle support collar, a third bearing positioned in the third axle support collar and at least partially rotatable relative to the third axle support collar; and a fourth bearing positioned in the fourth axle support collar and at least partially rotatable relative to the fourth axle support collar;

wherein the first bearing inner race and the second bearing inner race maintain their positions relative to one another with the first bearing outer race and the second bearing outer race move relative to one another; and the axle rotates in the first, second, third, and fourth bearings relative to the frame.

\* \* \* \* \*